United States Patent
Le Dinh et al.

(10) Patent No.: US 7,668,397 B2
(45) Date of Patent: Feb. 23, 2010

(54) APPARATUS AND METHOD FOR OBJECTIVE ASSESSMENT OF DCT-CODED VIDEO QUALITY WITH OR WITHOUT AN ORIGINAL VIDEO SEQUENCE

(75) Inventors: Chon Tam Le Dinh, Montreal (CA); François Rossignol, Montreal (CA); Hong Thai Nguyen, Vancouver (CA)

(73) Assignee: Algolith Inc., Montreal, Quebec (CA)

( * ) Notice: Subject to any disclaimer, the term of this patent is extended or adjusted under 35 U.S.C. 154(b) by 642 days.

(21) Appl. No.: 11/387,720

(22) Filed: Mar. 24, 2006

(65) Prior Publication Data
US 2006/0268980 A1 Nov. 30, 2006

Related U.S. Application Data

(60) Provisional application No. 60/664,948, filed on Mar. 25, 2005.

(51) Int. Cl.
G06K 9/40 (2006.01)
G06K 9/46 (2006.01)

(52) U.S. Cl. ...................... 382/275; 382/232

(58) Field of Classification Search ............. 382/159, 382/250, 251, 286, 275, 173, 190, 232, 239, 382/243, 244, 252, 254; 348/180–181, 189; 375/240.19, 240.2
See application file for complete search history.

(56) References Cited

U.S. PATENT DOCUMENTS

| | | | |
|---|---|---|---|
| 5,329,379 A | | 7/1994 | Rodriguez et al. |
| 5,446,492 A | | 8/1995 | Wolf et al. |
| 6,055,015 A | * | 4/2000 | Edwards ............ 348/192 |
| 6,075,884 A | * | 6/2000 | Lubin et al. ............ 382/156 |
| 6,252,905 B1 | | 6/2001 | Pokrinchak et al. |
| 6,285,797 B1 | | 9/2001 | Lubin et al. |
| 6,493,023 B1 | | 12/2002 | Watson |
| 6,496,221 B1 | | 12/2002 | Wolf et al. |
| 6,822,675 B2 | * | 11/2004 | Jung et al. ............ 348/180 |
| 6,823,009 B1 | | 11/2004 | Baina et al. |
| 6,876,381 B2 | * | 4/2005 | Van Zon ............ 348/180 |
| 7,038,710 B2 | * | 5/2006 | Caviedes ............ 348/180 |
| 7,107,251 B1 | * | 9/2006 | Baina et al. ............ 706/12 |
| 2004/0175056 A1 | * | 9/2004 | Lee ............ 382/286 |
| 2007/0161351 A1 | * | 7/2007 | Lee et al. ............ 455/69 |

FOREIGN PATENT DOCUMENTS

EP 1 251 703 10/2002
WO WO 2005/074175 A1 * 11/2005

OTHER PUBLICATIONS

Tektronix "Picture Quality Testing", www.tek.com, pp. 1-11, Oct. 4, 2003.*

* cited by examiner

*Primary Examiner*—Daniel G Mariam
(74) *Attorney, Agent, or Firm*—Fasken Martineau DuMoulin LLP; Alexandre Abecassis

(57) ABSTRACT

A new approach to objective quality assessment of DCT-coded video sequences, with or without a reference is proposed. The system is comprised of a proprietary segmentation algorithm, a feature extraction process and a nonlinear feed-forward-type neural network for feature analysis. The methods mimic function of the human visual system (HVS): A neural network training algorithm is used for determining the optimal network weights and biases for both system modes of operation. The proposed method allows for assessment of DCT-coded video sequences without the original source being available (pseudo-reference mode). The pseudo-reference mode is also comprised of a proprietary DCT-coded video (MPEG) noise reducer (MNR), co-pending patent application No. 60/592,143.

5 Claims, 8 Drawing Sheets

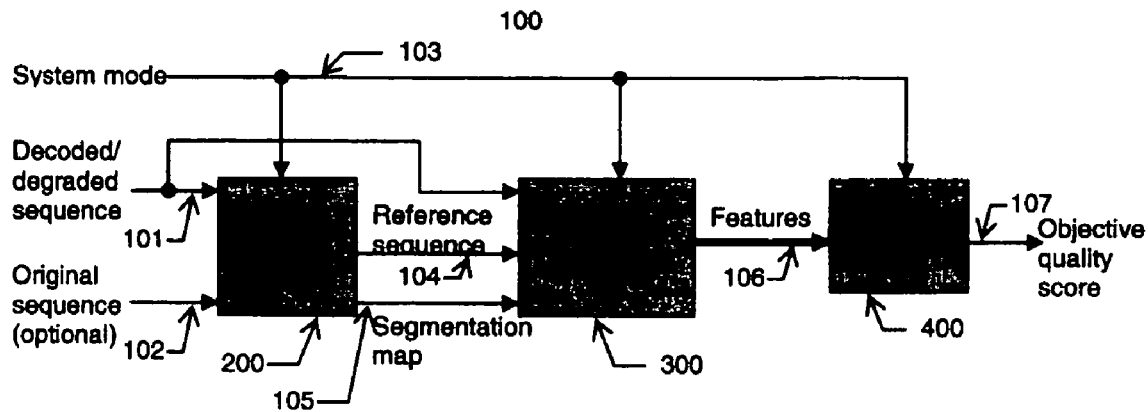
Figure 1– AsPecT - Objective Quality Assessment Main System Block Diagram
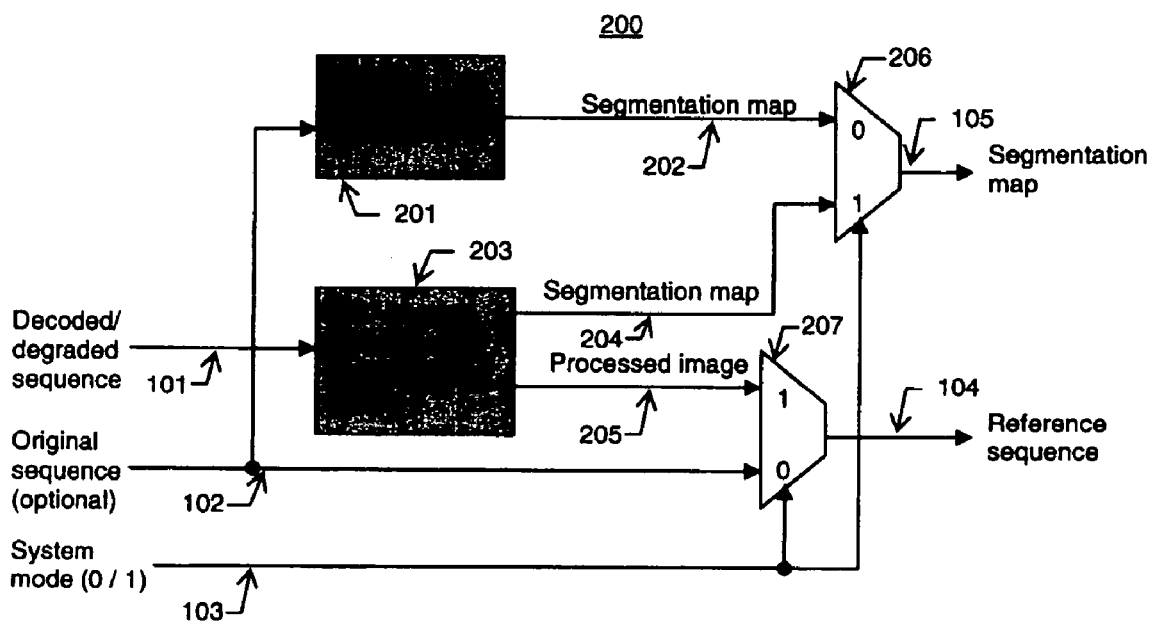
Figure 2– System Mode Selection Module Block Diagram

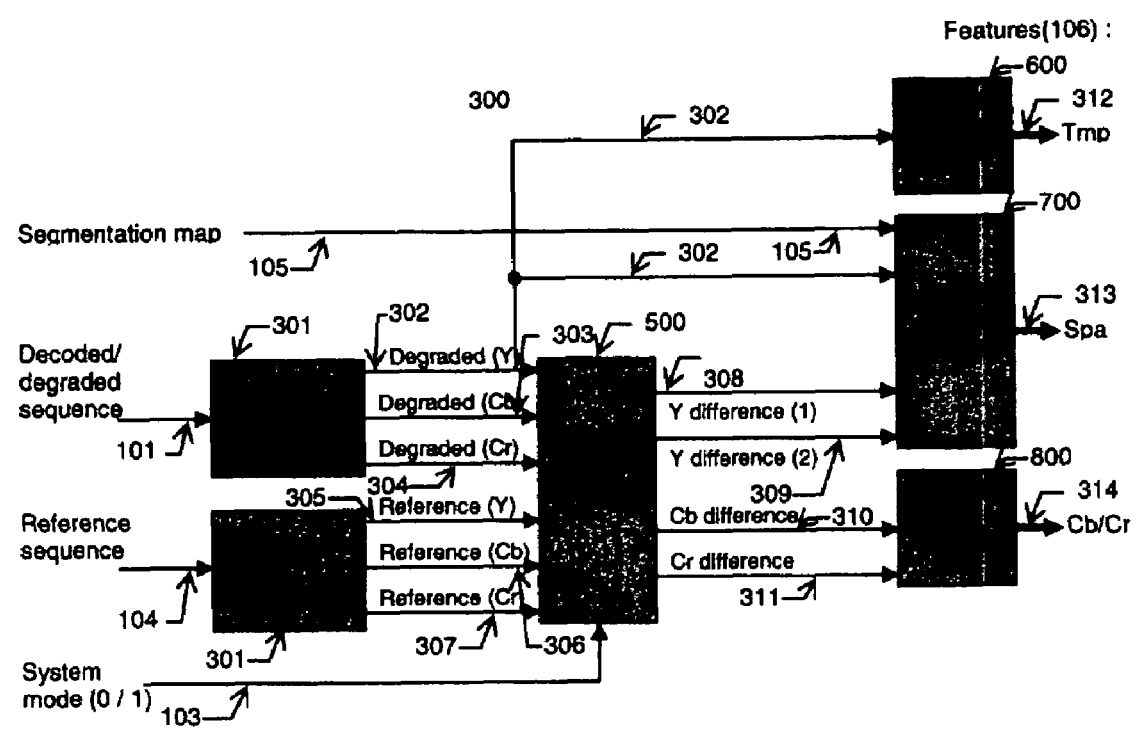
Figure 3— Feature Extraction Block Diagram

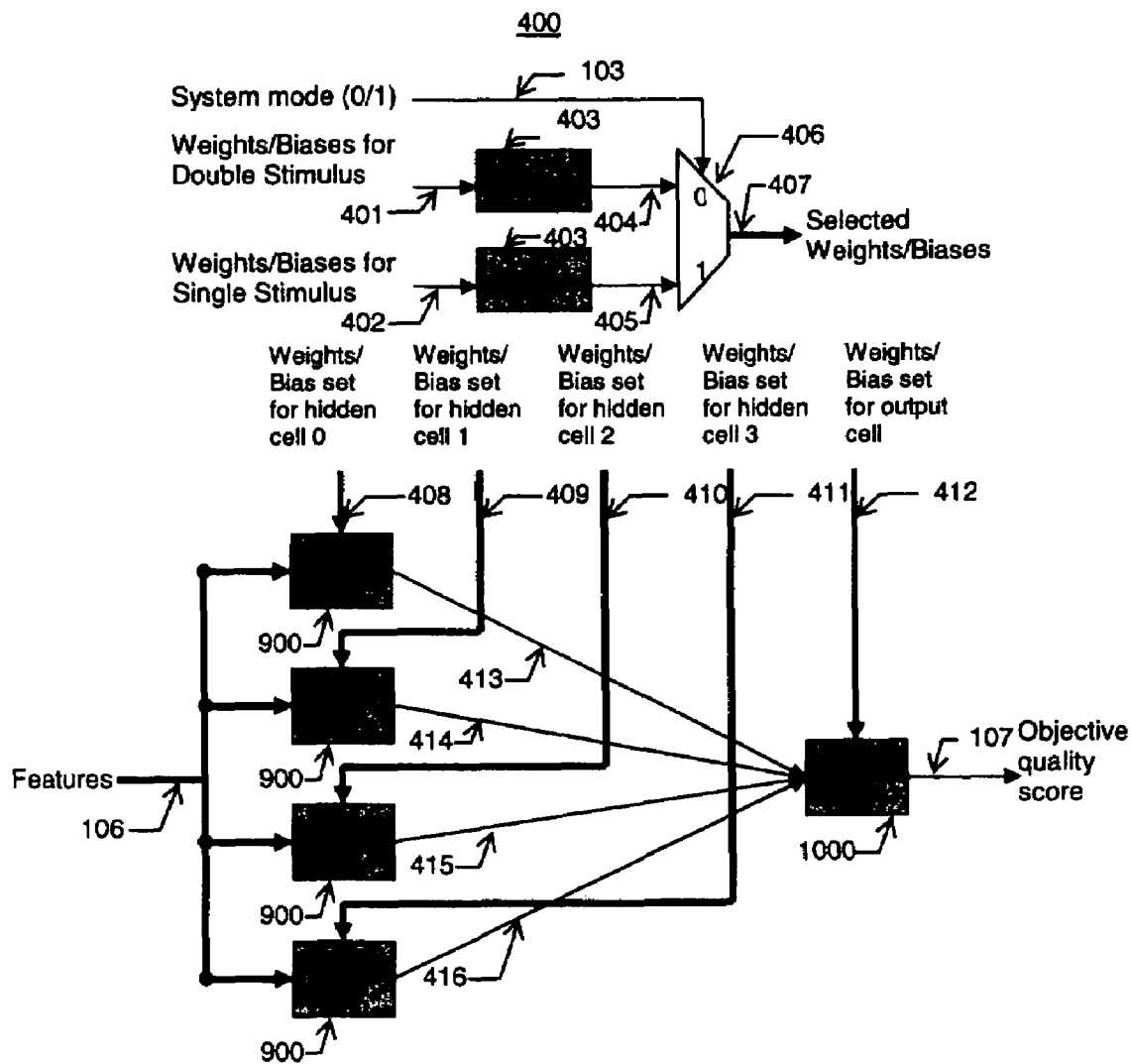
Figure 4– Feed-Forward Neural Network Block Diagram

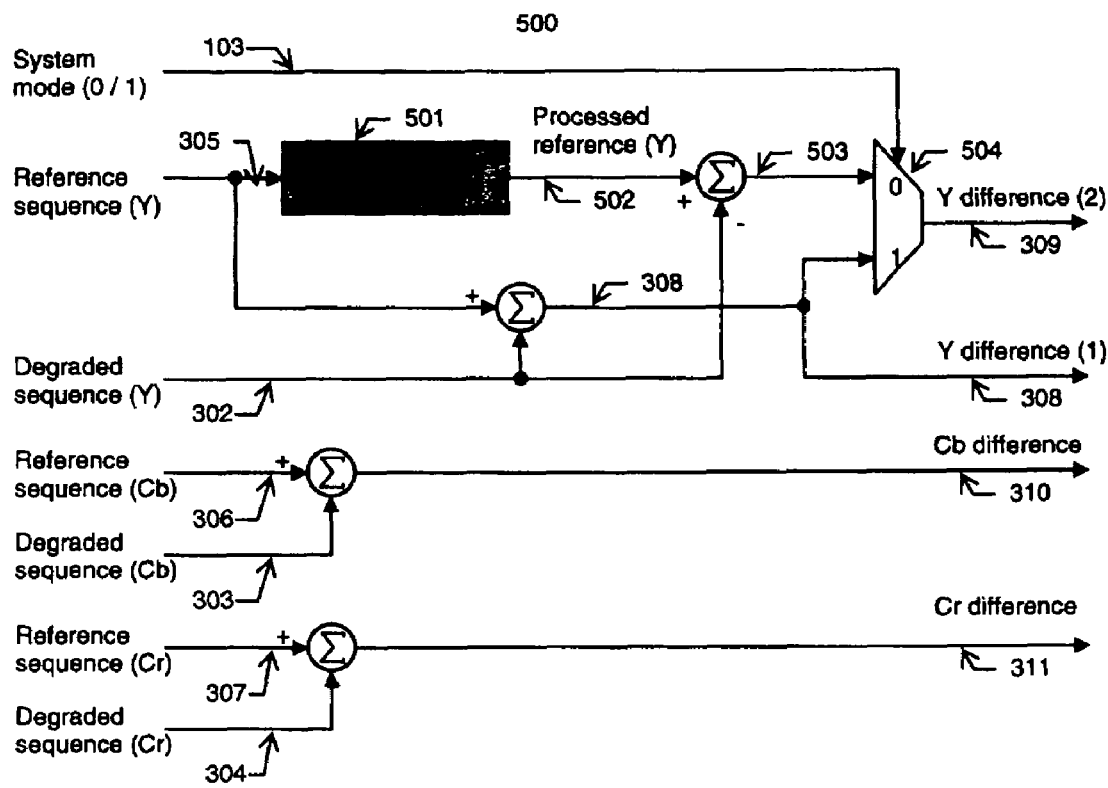
Figure 5– Image Difference Calculator Block Diagram
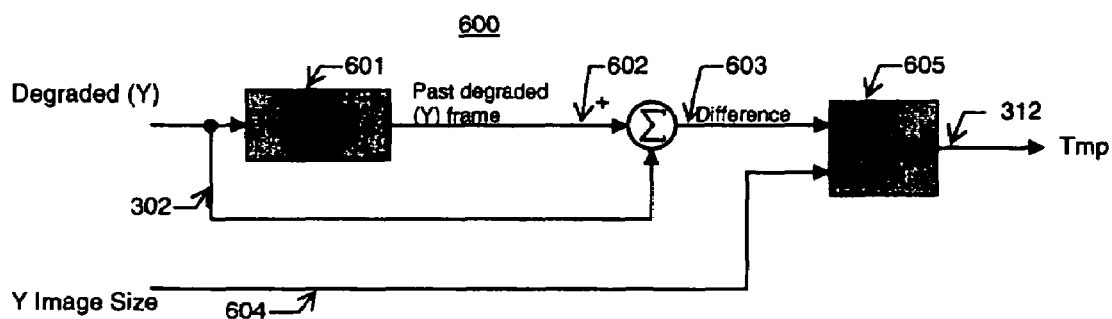
Figure 6– Temporal Feature Calculator Block Diagram

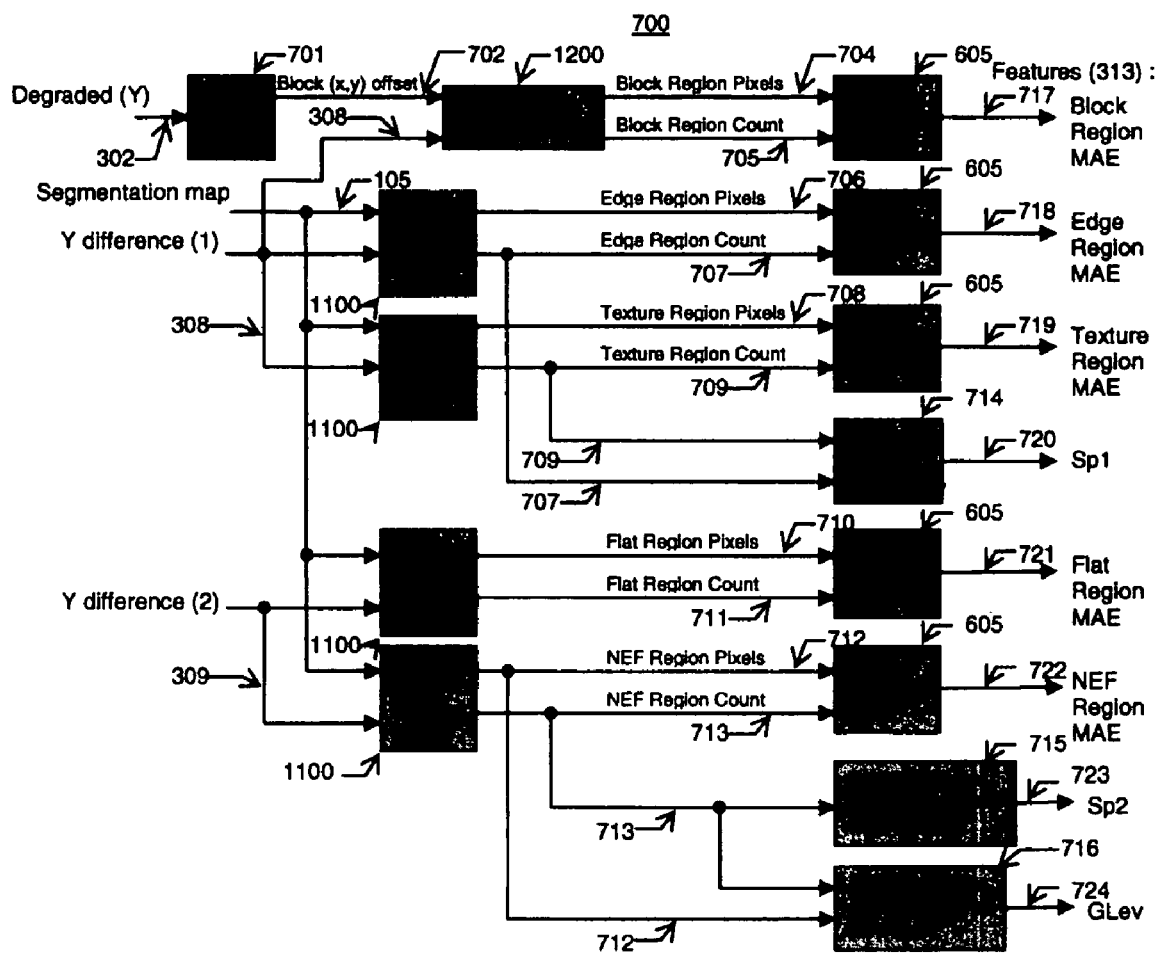
Figure 7– Spatial Features Calculator Block Diagram

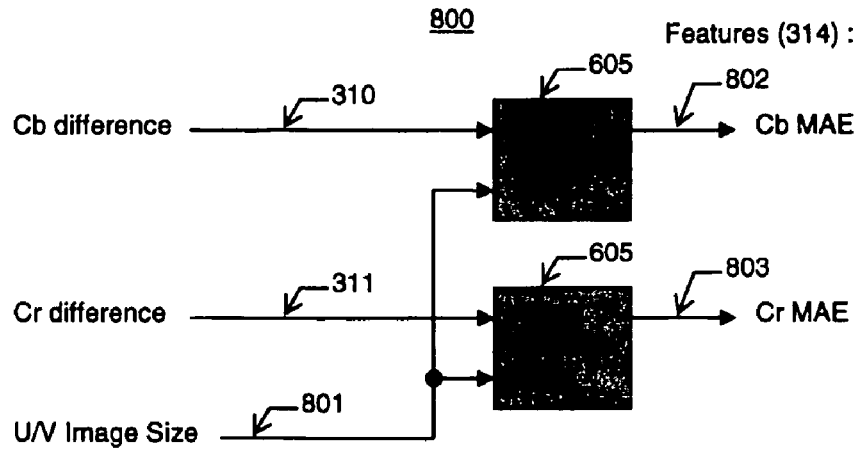
Figure 8– Chrominance (Cb/Cr) Features Calculator Block Diagram
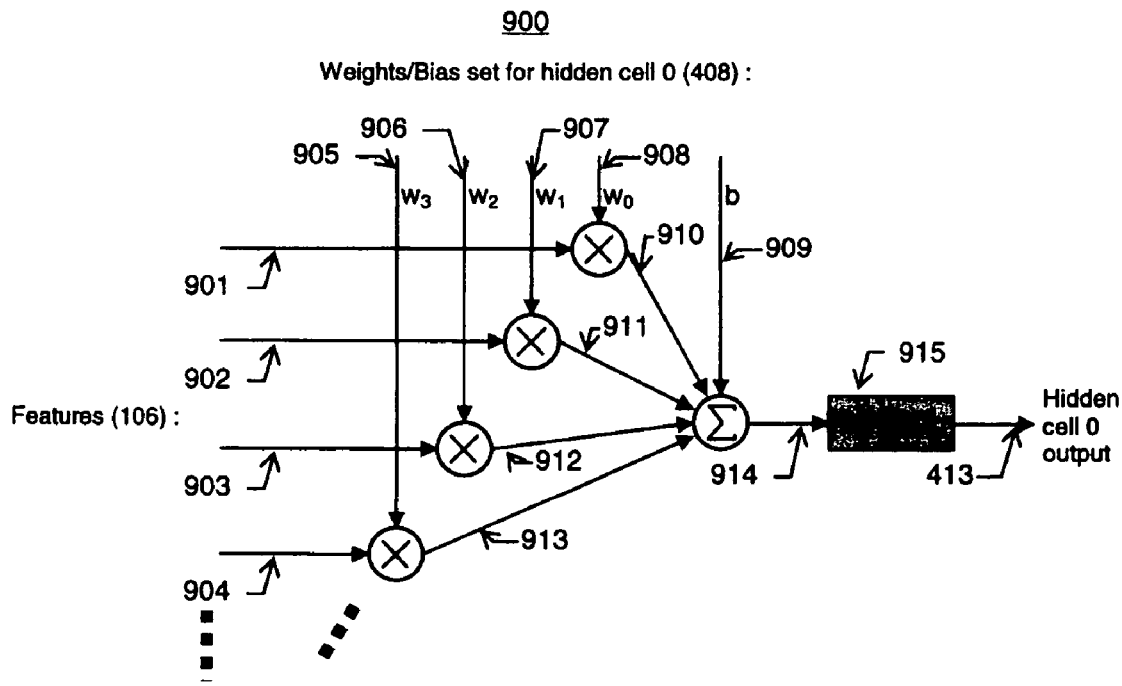
Figure 9– Neural Network Hidden Cell Block Diagram

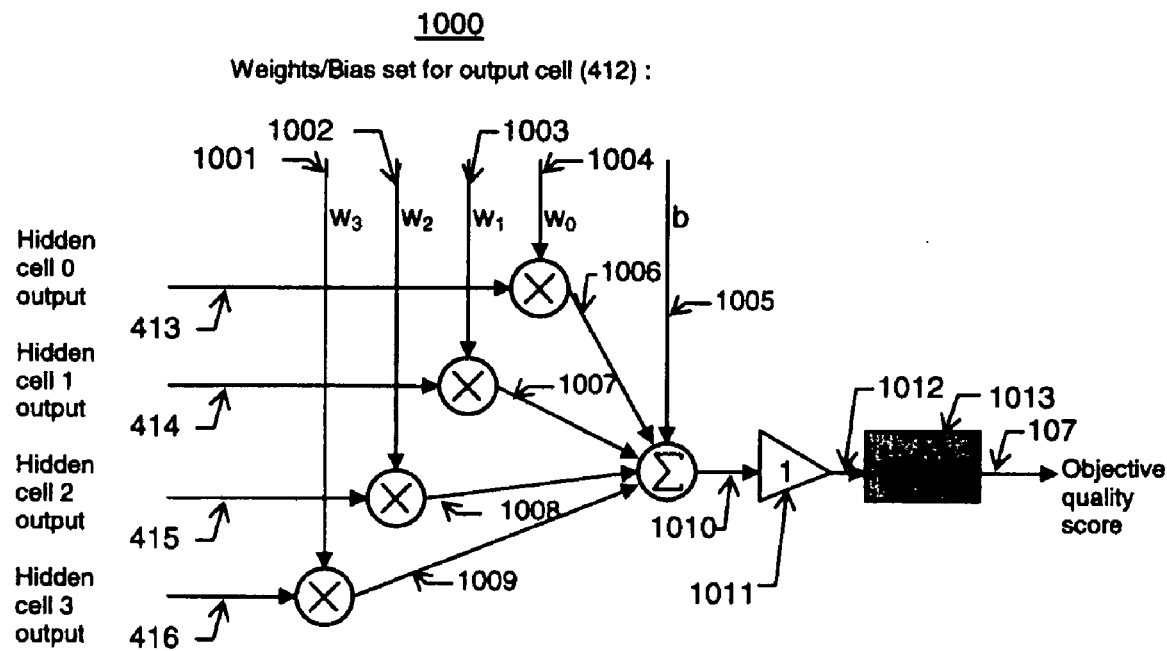
Figure 10– Neural Network Output Cell Block Diagram
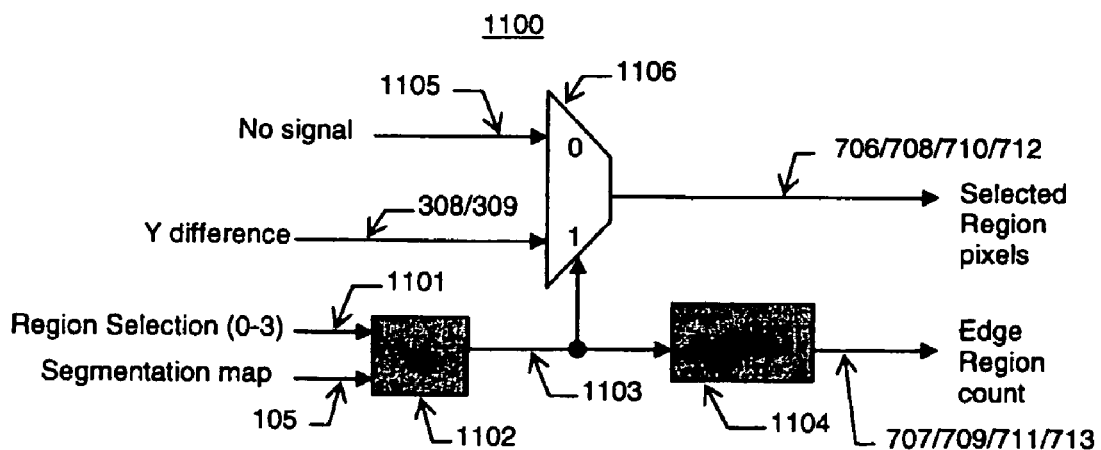
Figure 11– Selected Region Pixel Extractor with Counter Block Diagram

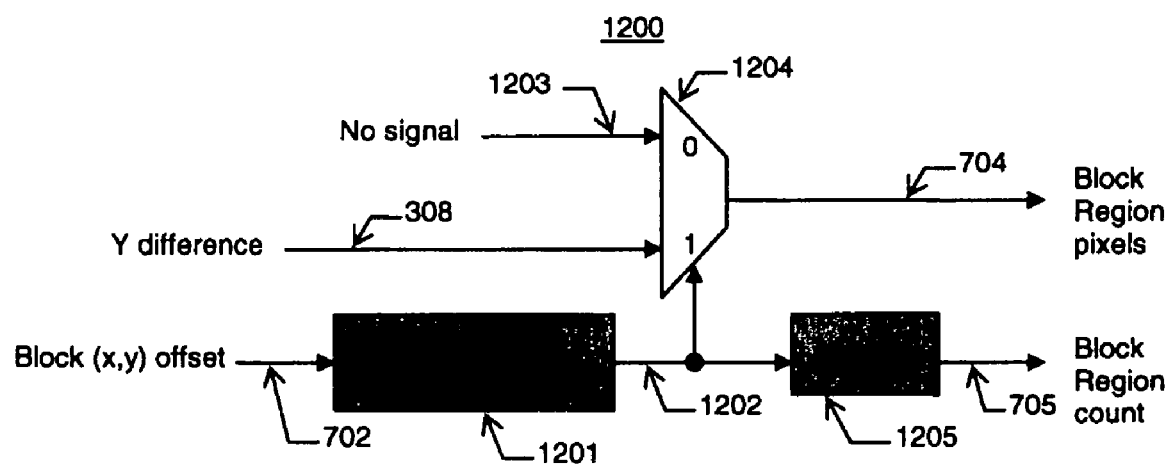
Figure 12– Block Region Pixel Extractor with Counter Block Diagram

APPARATUS AND METHOD FOR OBJECTIVE ASSESSMENT OF DCT-CODED VIDEO QUALITY WITH OR WITHOUT AN ORIGINAL VIDEO SEQUENCE

CROSS-REFERENCE TO RELATED APPLICATIONS

This application claims priority under 35 USC §119(e) of U.S. provisional patent application 60/664,948, filed Mar. 25, 2005, the specification of which is hereby incorporated by reference.

BACKGROUND OF THE INVENTION

1. Field of the Invention

The invention relates to objective assessment of digitally DCT-based encoded video quality. The proposed invention concerns real-time operations on a video sequence. More particularly, the invention relates to measurement methods used to evaluate the encoding efficiency (quality versus output bit rate) of DCT-based codecs such as the MPEG-2, MPEG-4 and H.264 standards.

2. Description of the Prior Art

The existing literatures and/or patents on digital video quality assessment are fairly new.

Digital video feature extraction techniques have also been studied in depth. U.S. Pat. No. 5,446,492 describes an efficient method for extracting features.

U.S. Pat. No. 5,329,379 describes a system and method for measuring fidelity of decompressed video signals and images. The system compares segments of color, luminance, shape, displacement and texture between a decoded image and its original. There is a global comparison or a local comparison mode that is user selectable.

U.S. Pat. No. 6,252,905 has described a real-time system for evaluating compressed picture quality within a video encoder. The system evaluates the quality of the compression algorithm directly after quantization of the frequency components. The system evaluates loss in the quantized signal for different quantization factors and selects the optimal quantization factor for the best quality. In this patent, the original sequence is required to evaluate quantization loss and it is more of an encoder feature. It also evaluates the degradation level in the frequency domain, not in the visual spatial domain.

U.S. Pat. No. 6,285,797 describes a method and apparatus for estimating digital video quality with a virtual video signal. The apparatus comprises a vision pre-processor, a virtual reference generator, a virtual distortion generator and an image quality metric generator. Basically the decoded/degraded sequence is processed to generate a virtual reference image. The virtual reference along with a visual distortion estimate is used to evaluate an image quality metric.

U.S. Pat. No. 6,823,009 describes a more general system for evaluating the degradation of a video image introduced by a digital transmission and/or storage and/or coding system. Again, the analysis is performed in the frequency domain, on the DCT coefficients. The method compares spatial activity levels between an input (unprocessed) sequence and its processed output sequence in a selected area within the image. Again, an original sequence is needed.

U.S. Pat. No. 6,493,023 describes a method and apparatus (DVQ) for evaluating the visual quality of processed digital video sequences. Again, the DCT coefficients are used for the analysis. The system is also used to adaptively control the encoding bit-rate of within a codec for optimal visual quality. The original sequence is required.

SUMMARY OF THE INVENTION

Digital video feature extraction techniques have also been studied in depth. The invention uses a neural network to analyze extracted features and then determines an objective quality rating. U.S. Pat. No. 5,446,492 describes an efficient method for extracting features. However, the system disclosed uses a different segmentation algorithm to simplify the feature extraction process.

Another originality of this system is that there are two modes of operation: with or without an original sequence. Most publications and patents describe a system that requires the original reference sequence. The proposed system design evaluates objective quality with or without an original sequence, all in the same system.

Digital video quality assessment is necessary to evaluate the performance of video compression algorithms. Video compression algorithms reduce the required bandwidth for transmitting digital video signals. By exploiting Spatial and temporal redundancy in a group of pictures, a raw video signal be compressed by 10 to 100 times depending on the desired quality. The quality and compression ratio depends on the lossy quantization levels. Quantization is like a rounding of a value, it is an approximation, so difference between the real value and the quantization value is lost and represents an error. In DCT-based codecs such as the MPEG-2 standard, an image is sub-divided into blocks and the DCT transform is applied to each block thus exploiting the spatial redundancy. The DCT transform has the property to represent low-frequency blocks with just a few non-zero coefficients. Run-length encoding suppresses the streaks of zeros, compressing the signal even further. The first frame of a group of pictures is intra-coded then the following frames are predicted from a reconstructed (decoded) reference frame as a reference. The prediction is accomplished using a motion estimation and motion compensation algorithm to exploit the temporal redundancy between frames. Each block in a predicted frame is represented by a motion vector, locating the position of the most similar block in the reference frame. Often, these motion vectors are (0,0) and can be further compressed with run-length encoding. Also, to compensate for any errors, the DCT coefficients of the prediction error are sent. Again, if the errors are small, most of the DCT coefficients will be zero and RLE will further compress the signal. Frames can also be predicted using two reference frames, one for forward prediction and one for backward prediction. The bidirectionally predicted frames have two motion vectors per block but the prediction is much more precise and the error signals are much smaller that those in forward predicted frames. When low bit rate signals are required, compression artefacts will often show up in a form of blocky pictures, mosquito noise and ringing around the edges and a significant loss of fine details in lightly textured areas. These artefacts become even more noticeable in sequences with plenty of spatial details and fast-moving objects.

Video signals can be represented using four dimensions. On a display screen, the group of pixels, addressed by (x,y) coordinates and covering the screen's surface, is the spatial domain. The intensity (z) of a pixel in an image is the luminance level. Image and video signals are usually separated into three components, either RGB (Red, Green and Blue) or YUV (YCbCr for Luma, Chroma blue and Chroma red). Each of these three components has an independent level of intensity. These three dimensions describe the still image. In video, we have the temporal domain (t) that represents the motion of objects in a sequence of images. The difference between two consecutive frames can be described as temporal activity (or redundancy) and this property is exploited by video compression algorithms.

Features extracted from video sequences come in different forms. The most common form is the error, difference or distance metric, obtained by comparison between a reference (usually an original) sequence and its processed version. A very popular quality measure used in image and video processing is the Peak Signal to Noise Ratio (PSNR) where the noise is the difference (error) between the original and the processed image. In different regions of an image, the human visual system (HVS) is more sensitive to degradations and DCT-based compression artifacts. Also, the sensitivity to these noises also depends on the amount of motion (temporal activity) in a sequence as well as the luminance levels in the backgrounds. Understanding the properties of DCT-coded video, we extract features that allow us to determine just how visible these artefacts are, considering the properties of the human visual system (HVS). The extracted features are calculated on one or more images and their resulting values help describe the overall quality of an image and also to assess the nature or type of scene that the image contains. In video signals, features may be temporal to determine the level of temporal activity in a sequence. A good way of determining features is by calculating errors, that is using the image difference between a reference image and a degraded image. The features may be extracted in different regions of an image by using a segmentation algorithm, yielding different error measures for each region. In general, extracted features are associated to spatial errors, spatial content, temporal content and grey levels in a sequence.

As already mentioned, the analysis of the extracted features is performed by a feed-forward neural network in one embodiment. The trained network receives as inputs, the extracted features of a sequence or a segment and determines an objective quality score as its output. A neural network is very similar to an adaptive FIR filter in the way that the inputs are weighted by coefficients and then added together. The difference is that with neural networks, a non-linearity follows each summation, which allows for multiple cells to be added side-by-side and multiple layers to be concatenated. For example in FIG. 4, a neural network is shown with one hidden layer containing four (4) hidden cells and an output layer containing one (1) output cell.

It will be appreciated that the proposed feature extraction process is region-based and uses a segmentation algorithm. Additionally, a neural network is used to determine the quality metric, regardless whether there is a original sequence or not.

The present invention provides an apparatus and method for objectively assessing DCT-coded video quality, with or without a original sequence.

According to a further aspect of the present invention, there is provided an apparatus and method for extracting features for a processed/degraded video sequence. The method extracts these features either with or without a reference (original) sequence being present. The extracted features describe the nature of the sequence by providing spatial and temporal information.

According to a further aspect of the present invention, there is provided an apparatus and method for analyzing extracted features and determining an objective quality score. The process is similar in both cases where the original sequence is present or not.

According to one aspect of the invention, there is provided a method for assessing the quality of a video sequence generated from an original video sequence, the method comprising receiving the generated video sequence, generating a reference sequence using the received generated video sequence, extracting features from the received generated video sequence and the received reference sequence and analyzing the extracted features to provide an objective quality score indicative of the quality of the generated video sequence.

According to another aspect of the invention, there is provided an apparatus for assessing the quality of a video sequence generated from an original video sequence, the apparatus comprising an input means for receiving the generated video sequence and for providing a reference sequence using the received generated video sequence, a feature extraction unit for receiving the reference sequence and the generated video sequence and for generating an extracted feature signal using the reference sequence and the generated video sequence, an objective quality score providing unit for receiving the extracted feature signal and for analyzing the extracted features to provide an objective quality score indicative of the quality of the generated video sequence.

According to another aspect of the invention, there is provided a method for assessing the quality of a video sequence generated from an original video sequence, the method comprising obtaining the original video sequence, extracting features from the generated video sequence and the original video sequence and analyzing the extracted features to provide an objective quality score indicative of the quality of the generated video sequence.

According to another aspect of the invention, there is provided an apparatus for assessing the quality of a video sequence generated from an original video sequence, the apparatus comprising storage means for storing the original video sequence, a feature extraction unit for receiving the generated video sequence and the original video sequence and for generating an extracted feature signal using the generated video sequence and the original video sequence and an objective quality score providing unit for receiving the extracted feature signal and for analyzing the extracted features to provide an objective quality score indicative of the quality of the generated video sequence.

From another broad aspect of the present invention, there is provided a reference to a unique spatial segmentation algorithm.

BRIEF DESCRIPTION OF THE DRAWINGS

Embodiments of the present invention will be now described with reference to the accompanying drawings, in which:

FIG. 1 is a general block diagram of a embodiment of the objective video quality assessment apparatus and method in accordance with the invention;

FIG. 2 is a block diagram of a system mode selection process which prepares the required signals for the feature extraction process and performs image segmentation required by the later process;

FIG. 3 is a block diagram of the feature extraction process that receives the selected signals according to the selected mode of operation;

FIG. 4 is a block diagram of the feed-forward-type neural network, used to analyze the extracted features and provide an objective quality score;

FIG. 5 is a block diagram of an image difference calculator, with embedded reference signal preprocessing, according to one embodiment;

FIG. 6 is a block diagram of the temporal feature calculation with embedded frame delay, according to one embodiment;

FIG. 7 is a block diagram of the spatial features calculation that uses the segmentation map provided by the segmentation algorithm. Also included is the block-artifact feature, the spatial content feature, the noisy region's surface and the grey level feature calculations, according to one embodiment;

FIG. 8 is a block diagram of the two chrominance component features, according to one embodiment;

FIG. 9 is a block diagram of a neural network hidden cell found in FIG. 4, according to one embodiment;

FIG. 10 is a block diagram of the neural network output cell found in FIG. 4, according to one embodiment;

FIG. 11 is a block diagram of the region classification. It uses the segmentation map and extracts the pixels of the input image belonging to the selected region. Also built-in is a counter for the pixels belonging to that region, according to one embodiment; and FIG. 12 is a block diagram of the block region pixel extraction. It includes a block boundary grid map generator. The generated grid map is used to extracts the pixels of the input image belonging to a block boundary. Also built-in is a counter for the pixels belonging to that region, according to one embodiment.

DETAILED DESCRIPTION

Referring now to the drawings, FIG. 1 represents a block diagram of the objective video quality assessment apparatus and method.

The apparatus and method starts from three (3) main system inputs. The first input 101 is the decoded/degraded Image video signal composed of the luminance (Y) and the two chrominance (Cr, Cb) components. Persons of ordinary skill in the art will understand that, except when not appropriate, such system components may be implemented in a time sharing manner or in parallel as is well known in the art. The second input 102 is of the same type as 101 and is optional. It is the original clean source video sequence that serves as a reference. The third input 103 is binary (0 or 1) and corresponds to the system mode, which indicates whether the original reference sequence is available or not.

The apparatus and method comprises three (3) main blocks: System Mode Selection 200 (also referred to as input means comprising a system mode selection unit), Feature Extraction 300 (also referred to as a feature extraction unit) and Neural Network 400 (also referred to as a objective quality score providing unit) all connected in cascade.

The System Mode Selection 200 is described in detail below with reference to FIG. 2. It receives video inputs 101 and 102 as well as the control input 103. The sub-system prepares the necessary data for Feature extraction 300. It outputs the reference sequence 104 and a segmentation map 105 provided by the segmentation algorithm in FIG. 2, both sent to 300.

The Feature Extraction block 300, described in detail below with reference to FIG. 3, also receives the video input signal 101 and control input 103 as well as the reference video signal 104 and segmentation map 105 to generate its output features 106. The extracted features are sent to the Neural Network 400.

The Neural Network 400, described in details below with reference to FIG. 4, receives the extracted features 106 as well as the control input 103. The neural network 400 analyses its input features and outputs an objective quality score 107, which is also the system's output.

Referring now to FIG. 2, there is illustrated as a block diagram, the system mode selection process, which prepares the required signals for the feature extraction process and performs image segmentation, in accordance with one embodiment.

The system mode selector receives video inputs 101 and 102 and control input 103 to create an image segmentation map 105 and a reference video signal 104. The decoded/degraded component Y in Video Input signal 101 is sent to a DCT-based compression noise reducer 203 and a cleaner, less-noisy version is created as a reference in the event the original reference sequence input 102 is unavailable. The DCT-based compression noise reducer is an advanced algorithm, designed to noticeably reduce compression artifacts produced by DCT-based codecs. Also known as MNR (MPEG Noise Reducer), this noise reducer described in co-pending U.S. patent application 60/592,143 which is hereby incorporated by reference. The noise reducer's output 205 is sent to multiplexer 207 as input-1. If available, the original sequence is sent to multiplexer 207 as input-0 and to the image segmentation algorithm 201. The segmentation algorithm used in this system is described in patent application no. PCT/CA02/00887 which is hereby incorporated by reference and is a sub-module of the MNR algorithm 203. The segmentation map is a bitmap that associates each pixel of the input image to one of four different regions. The output 202 is sent to multiplexer 206 as input-0. In the event when the original sequence 102 is not available, the segmentation map 204 is created by the MNR 203 is sent to multiplexer 206 as input-1. Control input 103 is fed as the selector input to both 206, 207 multiplexers. Let the value of 103 be 0 if the original reference sequence 102 is available, 1 if it is not available. Multiplexer 206 will selected the segmentation map 202 originating from the original reference 102 if input 103 is set to 0. Otherwise, 206 will select the segmentation map 204 originating from the decoded/degraded sequence 101, which will be slightly different depending on the 101 quality. The output signal from 206 will be the segmentation map 105 used in the feature extraction process. Multiplexer 207 will select the original reference sequence 102 if input 103 is set to 0. Otherwise, 207 will select the MNR-processed sequence 205 as the output reference signal 104 used in the feature extraction process.

It will be appreciated that only the pseudo-reference mode must generate a pseudo-reference as an improved version of the decoded/degraded sequence. The difference image is obviously different from the one in the full-reference mode and it depends on the degradation level of the sequence to be assessed.

Referring now to FIG. 3, there is illustrated in block diagram, the feature extraction process. The first step is to separate the video components in video signals 101 and 102 in a luminance (Y) and two chrominance (Cb, Cr) components. Component 301 separates 101 and 102 into these respective components as 302, 303, 304 for 101 and 305, 306, 307 for 102. Input control 103 and the 302-307 signals are sent to the image difference calculator 500, detailed in FIG. 5. The image difference calculator provides 4 difference signals, two for the Y component 308, 309 and one for each chrominance component 310, 311. The difference between the two Y-difference signals is that the second signal 309 is pre-processed, depending on the input signal 103 setting, as described later in FIG. 5. The segmentation map 105 is the last of the FIG. 3 inputs and is sent to spatial features calculator 700, described in FIG. 7. Also sent to the spatial features calculator are both of the Y-difference signals 308, 309 as well as the Y component of the decoded/degraded sequence 302. The spatial features are calculated by 700 and output at bus 313, also described in FIG. 7. These features will be sent to the neural network 400 for analysis. The Y component of the decoded/degraded signal 302 is also sent to the temporal feature calculator 600, described in FIG. 6. The temporal feature calculator outputs the temporal feature value 312, which will also be sent to the neural network 400 for analysis. Finally the Cb and Cr components of the difference image 310, 311 are sent to the Cr/Cb features calculator, described in FIG. 8. These chrominance features will be output at bus 314, also described in FIG. 8. The features will also be sent to the Neural Network 400 for analysis.

Referring now to FIG. 4, the Neural Network 400 is presented in a block diagram. The neural network receives the extracted Features in bus 106, which is the combination of the 312 temporal feature, the 313 spatial features and 314 Cb/Cr features, all described later in FIGS. 6,7 and 8. The Weights and biases of the neural network are stored in memory at system startup. There are two sets of weights and biases 401,402 for each system mode of operation. The system mode input control 103 determines which set of weights and biases is used by the neural network; this signal is the selector input for multiplexer 406. Multiplexer 406 receives the two sets of weights and biases 404,405 from the system's memory 403. The selected set of weights and biases is sent via 407 to the neural network. The 407 bus is separated in 5 buses 408-412, each dedicated to a hidden cell 900 or the output cell 1000. The same features in 106 are fed to each of the network's hidden cells 900. Buses 408-411 also feed these hidden cells, each bus contains the optimal weight and bias values for their dedicated hidden cell. The hidden cell 900 is described with detail in FIG. 9. Each hidden cell computes one of the outputs 413-416, that will be sent to the output cell 1000. The 412 bus also feeds the output cell, the bus contains the optimal set of optimal weights and bias for the output cell. The output cell 1000 is described in detail in FIG. 10, it computes the overall system's output 107, which is the objective quality score of the decoded/degraded video sequence.

Before moving on to the description of FIG. 5, it is interesting to introduce some theoretical background on neural networks. Usually, the neural network is adapted in the same way we adapt an FIR filter, by using an error-minimization algorithm. The least-mean-square (LMS) optimization algorithm is implemented in software and requires double floating-point precision to be effective. For neural networks, the back-propagation algorithm is used to adapt the weights and biases cell by cell, starting from the output error and propagating the error sensitivities towards the inputs. For finding an optimal solution, the gradient descent method uses the cells' derivatives (gradients) to minimize the error between the actual outputs and the target outputs. To help overall performance, batch training of all the available data is performed to find the global minimum mean square error (MSE). Since the proposed neural network is kept small (100 weights/biases or less), the software implementation of the training algorithm uses the Levenberg-Marquardt (LM) non-linear optimization algorithm. Levenberg-Marquardt is a modified Newton's minimization method of second order. The algorithm is the fastest of the most suitable feed-forward neural network training algorithms. It is designed to find the minimum mean square error of a complex nonlinear function with less iteration than any other algorithm. Before the training process begins, the weights and biases are initialized with relatively small and random values. For this purpose, the Nguyen-Widrow initialization method is used. Then, the iterative training process begins by inputting a collection of extracted features from different sequences with a desired target output to allow the network to adapt (learn). The training process adapts the weights and biases so that the actual outputs match the target outputs with the least mean square error (MSE) possible. The algorithm eventually reaches a minimum mean square error, which may represent the global minimum for the nonlinear system or a local minimum to which the algorithm undesirably converged to. Multiple tests are done to assure that the global minimum mean square error is reached. The Nguyen-Widrow initialization method doesn't guarantee that the iteration process will converge to the global minimum but it is one of the best for reaching it with the fewest attempts.

The goal of a training algorithm is to find the optimal set of weights and biases that minimize the error between the neural net's output and the training data (actual values). These algorithms are iterative and belong either in the LMSE (Least-Mean-Squared Error) or LMAE (Least-Mean-Absolute Error) classes. The simplest algorithm is the Gradient Descent which uses the output error function's derivative to find the minimum error. The Newton method uses both the first and second order derivatives to find the minimum. The second derivative helps in the convergence near the minimum and therefore reduces the number of iterations required. A more complex method is the Levenberg-Marquart (LM) algorithm which is a modified version of the Newton Method. It uses matrices in the calculation of the minimum. Using these matrices, the number of iterations for convergence is further reduced. It is to be noted that the LM algorithm is suitable for small neural nets (1000 weights and biases or less) since a single iteration requires the inversion of a Matrix, which may become computationally expensive for large matrices.

Among the different types of neural networks that may be used are the Perceptron, the Multi-Layer Perceptron (MLP) Network (with one or more hidden layers), the Radial Basis Function (RBF) Network and the High-Order Neural Network. The Multi-Layer Perceptron Network cells have a non-linear function instead of discrete thresholds. The Radial Basis Function Network hidden cells have Circular Functions. The major difference here is the derivative of these functions may change signs during the training process while the non linear functions of the Multi-Layer Perceptron Network have an always-positive derivative. The High-Order Network hidden cells have functions of different orders ranging from the first order (in the first hidden layer cell) to the Nth order (in the Nth hidden layer cell). The Multi-Layer Perceptron is the simplest of the three network types and is also the easiest to train, that is, it is easier to find the global minimum error than in the other more complex Networks.

The ability to combine multiple cells in a layer and to concatenate multiple layers, allows emulation of the most complex nonlinear systems. However, for the system representation to be effective, sufficient training data is required. Therefore, the ability of the neural network to represent the HVS depends on the amount of subjective (training) data acquired from the panel of viewers. When little data is available for adapting the network, using a large number of cells and input features will make the network memorise the training data but it will not be able to process untrained inputs very well. In those conditions, the neural network will not represent the real HVS. The best solution is to have plenty of training data or to keep the size of the network small if real data is limited. The problem with limited training data is that the system representation is also limited. The number of inputs (features) is also important. A larger number of features may help to better characterize a sequence but a too large number of features may result in a network size too large for the amount of available training data. To minimize the number of inputs, the features, as described in FIG. 3, must be independent from each other and they must be useful. The most useful features may be correlated with the target output (a subjective quality score), or may act as a correction factor on other features to be more correlated with the desired output.

It is also worthwhile to mention that the amount of training data for the pseudo-reference system mode should be very large. Pseudo-reference assessment is different, even for human viewers, because there's no more relative comparison with an original. As a result, the acquired training data maybe different and more scattered. A solution to this problem is to use the same training data as in the full-reference mode. However, due to the nonlinear variations of the extracted features, a larger bank of training data is required to better represent the pseudo-reference system. A good way of generating more (artificial) training data is by using the stable full-reference system to generate more training data for the pseudo-reference system.

It is interesting to mention that the network weights and biases will differ according to the types of sequences used in training. For example, sports sequences will yield different weights and biases than cartoon sequences. For better generality, it is important to use all types of sequences during training.

Referring now to FIG. 5, there is illustrated in block diagram, the image difference calculator. The inputs are the three components of the decoded degraded video sequence 302, 303, 304, the three components of the reference video sequence 305, 306, 307 and the system mode control input 103. Basically, a subtraction operation is performed pixel-by-pixel for each video component between the reference video and the decoded/degraded video signals. Therefore, 305 is subtracted by 302 to create an image difference sequence for the Y component 308. In the same way, 306 is subtracted by 303 for the Cb difference signal 310 and 307 is subtracted by 304 for the Cr difference signal 311. Another Y component difference signal is calculated from a pre-processed version of the reference sequence. The preprocessor 501 applies a two-dimensional low-pass filtering on the Y component of the reference signal 302. The 2-D finite impulse response of the filter is:

$$Lp501(c, r) = \begin{bmatrix} 1 & 2 & 1 \\ 2 & 20 & 2 \\ 1 & 2 & 1 \end{bmatrix} / 32.$$

This filter performs a light low-pass filtering on the reference sequence to slightly remove any film grain noise in the flat areas of the image, including those flat areas near edges (NEF region). In the case when fine details are present, they should still remain in the processed image. The processing is applied on the entire image and results in the processed Y-reference signal 502. This signal is then subtracted by 302 to create a secondary image difference sequence 503 for the Y component. Both Y-difference signals 308, 503 are sent to multiplexer 504 to which the selector signal is the system mode control input 103. Multiplexer 504 will select the preprocessed version of the Y-difference signal 503 if the system mode is 0. Otherwise, it selects unprocessed signal 308 and both Y-difference signals 308, 309 will be identical. Signal 308-311 constitute the outputs of FIG. 5.

Referring now to FIG. 6, there is illustrated the temporal feature calculator 600. The calculator has the Y component of the degraded signal 302 and will output the temporal feature value as signal 312, as described in FIG. 3. Signal 302 goes thru a frame delay 601, which is basically a FIFO (First In, First Out) buffer of the same size as a frame of video signal. The delay's output 602 is the past frame signal relative to the current frame signal of the degraded/decoded Y-component signal 302. The past frame signal 602 is then subtracted by the present frame signal 302 to obtain a temporal image difference signal 603 as expressed in the following equation:

$$E_{603}(c,r) = Y_{past}(c,r) - Y_{pres}(c,r) \tag{1}$$

Signal 603 will serve in the Mean Absolute Error (MAE) calculation 605. The signal is already an error signal so all MAE 605 does is a mean of absolute values calculation like the following equation:

$$MAE = (1/N) \sum_r \sum_c |E(c, r)| \tag{2}$$

where N is the size of the Y component frame/field image in pixels set in signal 604. E(c,r) is the difference signal obtained in equation 1. It is to be noted that most of the features are calculated with the mean absolute error (MAE) metric between a reference frame and a frame from the degraded-decoded sequence. The MAE is simple to implement and unlike the mean square error (MSE) calculation, it requires no multiplications.

The amount of temporal activity in a sequence may be a factor to decide if the detail degradation and compression artefacts are more or less perceptible. For example, edge degradation is less noticeable when an object is in motion because the HVS is already busy trying to track the moving objects. However, encoding of the sequence becomes more difficult when there is a lot of motion of detailed content. The MAE of all the pixels between the present and past frames of the degraded-decoded sequence represents that measure. No reference is required to evaluate this feature.

Referring now to FIG. 7, there is illustrated in block diagram of one embodiment of the spatial features calculator. The subsystem receives, as described in FIG. 3, the decoded/degraded sequence Y component 302, both Y component difference signals 308, 309 and the segmentation map 105. At the top of the diagram, the blocking artifact feature calculation starts with the block artifact detector 701 described in co-pending U.S. patent application No. 60/592,143. The block artifact detector receives the decoded/degraded image 302 and detects the presence of noticeable blocking artifacts. If blocking artifacts are detected, 701 returns offset (x,y) coordinates 702 to relocate the position of the upper left pixel of the first block in the upper left corner of the image in relation to the upper left pixel of the image. If blocking artifacts are not detected, the default coordinate (0,0) value is sent via signal 702. If blocking artifacts are not detected, the value for this feature should be small, regardless of the real block offset. The coordinates in 702 are sent to the block boundary pixel extractor 1200. The block boundary pixel extractor is described with detail, in FIG. 12. It returns the extracted pixels 704 as well as the corresponding pixel count 705 for the current frame. Only at the end of the frame, will the MAE calculator 605 provide the valid block region feature output 717. The MAE calculation is described by equation 2 where N is the size of the Y component frame/field image in pixels. The global blocking artefact feature quantifies DCT-quantization errors, specifically that of the DC component.

At this point it is pertinent to describe the reason of being for each extracted spatial feature. First, the pixels are classified in four different regions according to the image content of the luminance (Y) component. These four regions are: Flat (and lightly textured regions), Textured, Edge and Near-Edge Flat (NEF). Each region has a different noise visibility level according to the HVS. For example, the JND (Just Noticeable Difference) in heavily textured regions is higher than in the flat regions, so more noise/degradation will be tolerated in texture due to that weaker noise/degradation visibility. The NEF region is the most susceptible region to noticeable noisy compression artefacts. Its feature quantifies mosquito noise, edge ringing and jerkiness. The Flat region is the least affected region by compression but may contain visible DCT-quantization errors and/or blocking artefacts. The edge and texture regions will measure the level of degradation or loss of details (blurring, smearing) due to quantization.

In order to divide an image into these four (4) regions, a segmentation algorithm is used to create a region map. Segmentation algorithms may vary and may classify into a different number of regions. A segmentation algorithm is applied to the original sequence when this video sequence is available. The sharper the reference is, the easier the edges are to detect, also the textured areas are actually detected as texture instead of flat. Segmentation on the degraded sequence is less precise.

The input segmentation map 105 is used for classifying the input video Y-difference signals' 308, 309 pixels in a particular region. The segmentation map has a value of 0 to 3 for each pixel depending of which of the 4 regions the pixel belongs to. For example, if the segmentation map value at (c,r) is 0, then the pixel at (c,r) for signal 308 belongs to the edge region. The Y-difference signal 308 is sent to both the edge region pixels extractor and the texture region extractor while the preprocessed Y-difference signal 309 is fed to both the flat region extractor and the NEF region extractor. Each region extractor 1100, described in FIG. 11, performs the same action depending on the selected segmentation value, 0 for edge region, 1 for texture region, 2 for flat region or 3 for NEF region. The pixel extractors 1100 return their corresponding region's pixels in signals 706, 708, 710 and 712 and their respective pixel counts in signals 707, 709, 711 and 713 for the present frame. Each pair of signals (706, 707), (708, 709), (710, 711), (712, 713) is sent to an MAE calculator for each region. Only at the end of a frame, will the MAE calculators 605 provide their respective region's valid feature outputs 718, 719, 721, 722. The MAE calculation is described by equation 2 where N is the frame/field image size of the Y component in pixels.

Using the same segmentation map, additional features are extracted to better describe spatial content. So far, the MAE features don't give any idea of the spatial content. For example, the surface area covered by detailed (texture and edge) regions gives an idea of how difficult a sequence is to encode. It will be appreciated that the NEF region is more noise sensitive than the others. One of the additional spatial features consists of the proportion of edge and texture pixels relative to the full image size (Sp1). A second additional spatial feature consists of the proportion of noise-sensitive NEF pixels relative to the full image size (Sp2). These two features will respectively determine spatial detail content and factors for overall noise visibility, without using the reference sequence.

The edge region count 707 and texture region count 709 are sent to the Spatial Complexity calculator 714. Its function is to calculate the $Sp_1$ feature 720 which represents a spatial content measure. The calculation is performed according to the following equation:

$$Sp_1 = \frac{2*(\text{Edge Count}) + (\text{Texture Count})}{3*(Y \text{ Image Size})} \quad (3)$$

It represents the proportion of the Edge and Texture regions' area in relation to the overall image area. The edge region has sharper details and stronger high-frequency components and therefore its area is accorded a weighting factor of 2 versus a weighting factor of 1 for the texture region's area. The NEF region count 713 is sent to the Noise-sensitive region's surface area calculator 715. Its function is to calculate the $Sp_2$ feature 723 which represents the proportion of the noise-sensitive NEF region's area in relation to the overall image area. Its value is determined as follows:

$$Sp_2 = \frac{(NEF \text{ Count})}{(Y \text{ Image Size})} \quad (4)$$

Noise visibility also depends on the intensity level in which the noise will be perceived. In darker and mid-grey areas, the eye is more sensitive to noise than in brighter regions. Knowing that the noise is most visible in the NEF region, another feature (GLev) that combines the proportion of pixels of lower intensity (0-128) can be created with the proportion of pixels of medium intensity (128-192). In other words, if most of the NEF regions are bright (above 192), the NEF MAE parameter will have less impact on the objective quality score.

The NEF region pixels 712 and the NEF region count 713 are sent to the noise-sensitive region's grey-level calculator 716. Its function is to calculate the $G_{Lev}$ feature 724 which represents the NEF region's grey level content. The calculation is performed as the following:

$$G_{Lev} = \frac{2*(Y_{NEF128}\text{Count}) + (Y_{NEF192}\text{Count})}{3*(NEF \text{ Count})} \quad (5)$$

Where $Y_{NEF128}$ Count is the number of NEF-region pixels whose intensity value is below 128 on a 0-255 range and $Y_{NEF192}$ Count is the number of NEF-region pixels whose intensity value is between 128 and 192. The HVS is more sensitive to noise when the local mean grey-level of a group of pixels is bellow 128, so the corresponding count is weighted by a factor of two in relation to the other 128-192 grey-level count. The HVS is less sensitive to noise when the grey-level is above 192, so these pixels are not considered in the $G_{Lev}$ calculation. Outputs 717-724 comprise of the features included in bus 313 as described in FIG. 3.

These three (3) additional spatial features, along with the temporal feature described in FIG. 6, will indirectly assist the other MAE features to help the neural network better interpret the assessed sequence.

Referring now to FIG. 8, there is illustrated in block diagram the Cb/Cr component global features calculator 800, in accordance with the invention. The Cb and Cr components of the difference image are sent to their respective MAE calculator 605. The MAE calculation is defined by equation 2 where N is now the size of the Cb/Cr component frame/field image in pixels, set in signal 801. Only at the end of a frame are the Cb and Cr feature values valid. Both signals 802 and 803 comprise the features included in bus 314 as described in FIG. 3.

Referring now to FIG. 9, there is illustrated in block diagram the neural network hidden cell 900, in accordance with the invention. As described in FIG. 4, the neural network is comprised of a hidden layer of multiple hidden cells and an output layer where the output cell performs the final calculations. The hidden cell in the diagram receives all of the extracted features from the 106 bus. It will be appreciated that the drawing is simplified by showing only four (4) features 901-904. Each feature is respectively multiplied by an optimized weight 905-908. These weights multiply their corresponding feature to generate the product signals 910-913, which are all sent to the summation to be added together along with the optimal offset bias value 909, resulting in a sum signal 914, which is sent to the nonlinear function, the Tan h lookup table (LUT) 915. The hyperbolic tangent is a popular nonlinear function used in neural networks to separate hidden cells from each other and all layers from each other. The lookup table receives a quantized input and provides a quantized output according to the following equation:

$$y = \tanh(x) = \frac{1 - e^{-x}}{1 + e^{-x}} \quad (6)$$

Theoretically, x may range from $-\infty$ to $\infty$ but generally, x can be clipped at $-8$ and $8$. The output range of the tan h(x) function is $-1$ to $1$. At x=$-8$ the output y is near $-1$ and at x=$8$ the output y is near $1$, so clipping at these values is proper and decreases the number of possible inputs for the LUT. System precision is determined by the number of bits used to quantize the input and output decimal values, usually 8 bits is sufficient. For example, the output range $-1$ to $1$ may be represented using 9 bits and the input range $-8$ to $8$ by using 12 bits. The LUT may be simplified even further by exploiting the different regions of the tan h(x) function curve. The tan h LUT output 413 will now be sent to the next layer, the output layer, described in FIG. 10. It is to be noted that the non-linearities can be continuous (hyperbolic functions) or discontinuous (thresholds) functions, as long as their derivative functions are continuous.

Referring now to FIG. 10, there is illustrated in block diagram one embodiment of the neural network output cell 1000, in accordance with the invention. Similarly to the hidden cells, the output receives inputs and calculates an output. The received inputs are the outputs from the previous hidden layer's cells 413-416. In this illustration, there are four inputs, meaning that the previous layer had four hidden cells. The range of these signals is $[-1,1]$, as described in the previous Figure. Each input signal is multiplied by an optimized weight 1001-1004. The weights multiply their corresponding input signal to generate the product signals 1006-1009, which are all sent to the summation to be added together along with the optimal offset bias value 1005, resulting in a sum signal 1010, which is sent to the linear gain 1011. Since this is the neural network's output it is proper to use a linear output function. The simplest form is a gain of 1. The range of this output is the range of the possible sum values. For a limited range, a limiter function 1013 would be used to set the lower and upper limits. Of course, that function is not to be included in the network training process. The resulting output signal 107 consists of the objective quality score for the decoded/degraded input video sequence 101, as described in FIG. 1.

Referring now to FIG. 11, illustrated in block diagram is the selected region pixel extractor with counter according to one embodiment. One of the Y difference signals 308 or 309 is sent to multiplexer 1106. The desired region selection, whose values range from 0 to 3, is set in signal 1101. The segmentation map 105 is sent to comparator block 1102 to be compared with signal 1101. The output of the comparator 1103 is 1 when the segmentation map's pixel value matches the value of 1101 and 0 otherwise. Signal 1103 serves as the selector signal for multiplexer 1106. A pixel will be sent via 701 if the selector is 1, otherwise no signal is sent. For each time the segmentation map's value matches the 1101 value, counter 1104 increments for the present frame. At the beginning of the next frame, the counter is reset to 0 just before the first pixel comparison.

Referring now to FIG. 12, illustrated in block diagram is the block boundary region pixel extractor with counter according to one embodiment. The unprocessed Y-difference signal 308 is sent to multiplexer 1204. The block offset coordinates in 702 are sent to a block boundary binary grid map generator 1201. The binary grid map 1202 contains a 1 if the associated pixel is located on a block boundary, 0 otherwise. Signal 1202 serves as the selector signal for multiplexer 1204. A pixel will be sent via 704 if the selector is 1, otherwise no signal is sent. For each time the grid map's value is 1, counter 1205 increments for the present frame. At the beginning of the next frame, the counter is reset to 0 just before the first pixel consideration.

What is claimed is:

1. An apparatus for assessing the quality of a video sequence generated from an original video sequence, said apparatus comprising:
    an input means for receiving said generated video sequence and for providing a reference sequence using said received generated video sequence, said input means comprising a system mode selection unit for receiving said original video sequence and for providing a segmentation map using at least one of an image segmentation algorithm and a compression noise reducer (MNR), wherein said reference sequence is generated using one of said original video sequence and said generated video sequence according to a user selection;
    a feature extraction unit for receiving said reference sequence, said generated video sequence and said segmentation map and for generating an extracted feature signal using said reference sequence, said generated video sequence and said segmentation map;
    an objective quality score providing unit for receiving said extracted feature signal and for analyzing said extracted features to provide an objective quality score indicative of the quality of said generated video sequence.

2. The apparatus as claimed in claim 1, wherein said feature extraction unit comprises a first component separation unit for receiving said generated video sequence and for providing a first component separated signal, wherein said feature extraction unit further comprises a second component separation unit for receiving said reference sequence and for providing a second component separated signal, said feature extraction unit further comprising an image difference computing unit for receiving said first component separated signal and said second component separated signal and for providing a signal indicative of said image difference, further wherein said feature extraction unit further comprises a feature generating unit for receiving said signal indicative of said image difference and for providing said extracted feature signal.

3. The apparatus as claimed in claim 2, wherein said first component separated signal comprises a degraded Y signal, a degraded Cb signal and a degraded Cr signal, further wherein said second separated signal comprises a reference Y signal, a reference Cb and a reference Cr signal.

4. The apparatus as claimed in claim 1, wherein said objective quality score providing unit comprises a neural network for providing said objective quality score.

5. The apparatus as claimed in claim 4, wherein said neural network comprises a feed-forward neural network for providing said objective quality score.

* * * * *